United States Patent
Chen et al.

(10) Patent No.: US 10,172,052 B2
(45) Date of Patent: Jan. 1, 2019

(54) METHOD AND DEVICE FOR DYNAMICALLY CONSTRUCTING VIRTUAL CELL

(71) Applicant: ZTE CORPORATION, Shenzhen, Guangdong Province (CN)

(72) Inventors: Lin Chen, Shenzhen (CN); Fang Zhang, Shenzhen (CN); Yufeng Ruan, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/512,063

(22) PCT Filed: Mar. 6, 2015

(86) PCT No.: PCT/CN2015/073815
§ 371 (c)(1),
(2) Date: Jun. 28, 2017

(87) PCT Pub. No.: WO2015/154597
PCT Pub. Date: Oct. 15, 2015

(65) Prior Publication Data
US 2017/0303175 A1    Oct. 19, 2017

(30) Foreign Application Priority Data
Sep. 17, 2014   (CN) .......................... 2014 1 0476754

(51) Int. Cl.
| | | |
|---|---|---|
| H04W 36/30 | (2009.01) | |
| H04W 36/00 | (2009.01) | |
| H04W 16/32 | (2009.01) | |
| H04W 36/04 | (2009.01) | |
| H04W 36/38 | (2009.01) | |
| H04W 40/24 | (2009.01) | |

(Continued)

(52) U.S. Cl.
CPC .......... H04W 36/04 (2013.01); H04W 16/32 (2013.01); H04W 24/02 (2013.01); H04W 36/00 (2013.01);
(Continued)

(58) Field of Classification Search
CPC ..... H04W 36/00; H04W 16/10; H04W 24/06; H04W 16/22; H04W 36/30; H04W 36/38;
(Continued)

(56) References Cited

U.S. PATENT DOCUMENTS 8,600,389 B2 * 12/2013 Deng .................... H04W 36/24
370/331
10,003,979 B2 * 6/2018 Ko ....................... H04L 12/4641
(Continued)

FOREIGN PATENT DOCUMENTS

| CN | 102595543 A | 7/2012 |
| CN | 103476045 A | 12/2013 |
| CN | 103503517 A | 1/2014 |

*Primary Examiner* — Khawar Iqbal
(74) *Attorney, Agent, or Firm* — Ling Wu; Stephen Yang; Ling and Yang Intellectual Property

(57) ABSTRACT

Provided are a method and a device for dynamically constructing a virtual cell. The method includes: a master station sending an event A4 to UE and receiving an A4 measurement report from the UE; and the master station adding a cell corresponding to a cell identity carried in the A4 measurement report as a slave station, herein the master station and slave stations form a first virtual cell. In the technical solution, a serving cell selected by UE may be any cell and is not necessary to be a macro cell, the master station adds a cell which satisfies an event A4 as a slave station and thereby a virtual cell is realized.

19 Claims, 9 Drawing Sheets

(51) Int. Cl.
*H04W 24/02* (2009.01)
*H04W 84/18* (2009.01)

(52) U.S. Cl.
CPC ... *H04W 36/0038* (2013.01); *H04W 36/0088* (2013.01); *H04W 36/30* (2013.01); *H04W 36/38* (2013.01); *H04W 40/248* (2013.01); *H04W 84/18* (2013.01)

(58) Field of Classification Search
CPC ..... H04W 24/02; H04W 16/32; H04W 84/18; H04W 40/248; H04W 36/0038; H04W 36/0088
See application file for complete search history.

(56) References Cited

U.S. PATENT DOCUMENTS

| | | |
|---|---|---|
| 2013/0064226 A1 | 3/2013 | Dinan |
| 2014/0105050 A1* | 4/2014 | Kang .................... H04W 36/30 370/252 |
| 2014/0342741 A1* | 11/2014 | Li ......................... H04W 52/50 455/437 |
| 2015/0271811 A1* | 9/2015 | Kim .................... H04W 52/146 370/329 |
| 2015/0373626 A1* | 12/2015 | Yi ........................ H04W 48/20 375/132 |
| 2016/0056907 A1* | 2/2016 | Wei .................... H04W 72/1226 370/280 |
| 2016/0330659 A1* | 11/2016 | Zhu .................... H04W 36/0061 |
| 2017/0117993 A1* | 4/2017 | Yi ............................ H04B 7/26 |
| 2017/0215184 A1* | 7/2017 | Chang ............... H04W 72/0426 |
| 2017/0223547 A1* | 8/2017 | Yu ......................... H04W 16/04 |
| 2017/0238195 A1* | 8/2017 | Hao ....................... H04L 29/08 370/328 |
| 2017/0280467 A1* | 9/2017 | Zhu .................... H04W 72/0426 |
| 2017/0331625 A1* | 11/2017 | Chen ..................... H04W 12/04 |

* cited by examiner

METHOD AND DEVICE FOR DYNAMICALLY CONSTRUCTING VIRTUAL CELL

TECHNICAL FIELD

The present disclosure relates to the field of mobile communication, in particular to a method and a device for dynamically constructing a virtual cell.

BACKGROUND

In order to realize 5G goals such as increase of mobile data flow in each area at 1000 times of speed, increase of throughput of each user at 10 to 100 times of speed, increase of the number of devices connected by each user at 10 to 100 times of speed, increase of battery service life of low-power devices by 10 times and decrease of end-to-end delay by 5 times, some new wireless technical solutions must be put forward in 5G.

At present, Ultra-Dense Network (UDN) is an important means to achieve the first two indexes of 5G. The key technology of UDN is to enable a great number of nodes to coexist in a homogeneous or heterogeneous way in a dense region. Since ultra-dense deployment causes very serious interference between cells, a capacity of each area is impossible to linearly increase with the number of nodes in this area. In addition, when User Equipment (UE) moves between cells, a great amount of switching is caused. Ultra-dense deployment brings about a tough challenge to mobile signaling load and mobile robustness.

In the related art, in order to solve the problem existing in mobility, new concepts have already been put forward, e.g., virtual cells such as soft cell and phantom cell. A soft cell or phantom cell consists of a macrocell and microcells with best communication quality in neighboring cells of the macrocell. In a process of movement, UE only needs to change a microcell in the soft cell without being switched between microcells.

However, in the related art, if UE is not in the coverage range of the macrocell, a virtual cell cannot be realized.

SUMMARY

In order to solve the above-mentioned problem, embodiments of the present disclosure provide a method and a device for dynamically constructing a virtual cell, such that a virtual cell can be realized when UE is not in a coverage range of a macrocell.

In order to achieve the above-mentioned purpose, an embodiment of the present disclosure provides a method for dynamically constructing a virtual cell, applied to an ultra-dense network, including:

a master station sending an event A4 to User Equipment (UE) and receiving an A4 measurement report from the UE; and the master station adding a cell corresponding to a cell identity carried in the A4 measurement report as a slave station.

Herein the master station and slave stations form a first virtual cell.

In an exemplary embodiment, the master station adding a cell corresponding to a cell identity carried in the A4 measurement report as a slave station includes:

the master station generating a first virtual cell key according to a first current value of a first S counter and a key from a core network;

the master station acquiring cells corresponding to cell identities in the A4 measurement report, using the acquired cells as a slave station and sending a first adding request message to one of the slave stations;

the master station receiving a first adding command message from the slave station, generating a first encryption key according to the first adding command message and sending a first Radio Resource Control (RRC) connection reconfiguration message to the UE; and the master station receiving a first Radio Resource Control RRC connection reconfiguration completion message from the UE.

Herein the first adding request message includes the first virtual cell key and an encryption algorithm list; the first RRC connection reconfiguration message includes a first encryption algorithm in the first adding command message and the first current value of the first S counter; and the first adding command message includes the first encryption algorithm.

In an exemplary embodiment, the master station adding a cell corresponding to a cell identity carried in the A4 measurement report as a slave station further includes:

the master station sending a second adding request message to other slave stations of the first virtual cell; and the master station receiving second adding command messages from the other slave stations of the first virtual cell.

Herein the second adding request message includes the first virtual cell key and the first encryption algorithm.

In an exemplary embodiment, the first adding request message or the second adding request message further includes UE capability information, the first current value of the first S counter, a header compression algorithm and a UE identity; and the first RRC connection reconfiguration message further includes the header compression algorithm.

In an exemplary embodiment, the first virtual cell key is generated by the master station according to the key from the core network and the first current value of the first S counter.

In an exemplary embodiment, the method further includes:

after the master station adds the cell corresponding to the cell identity carried in the A4 measurement report as a slave station, the master station receiving an adding completion message from the slave station, the master station sending a first path switching request message to a Mobility Management Entity (MME) and receiving a first path switching acknowledgement message from the MME.

Herein the first path switching request message includes a first virtual cell identity, a master station identity of the master station in the first virtual cell and slave station identities of slave stations in the first virtual cell.

In an exemplary embodiment, the method further includes:

the master station sending an event A2 to the UE, the master station receiving an A2 measurement report from the UE and deleting a slave station corresponding to a slave station identity carried in the A2 measurement report; and the master station performing key updating on the UE and slave stations of a second virtual cell.

Herein the master station and other slave stations except the deleted slave station in the first virtual cell form the second virtual cell.

In an exemplary embodiment, the master station deleting a slave station corresponding to slave station identity carried in the A2 measurement report includes: the master station sending a deletion request message to the slave station corresponding to the slave station identity carried in the A2 measurement report; and the master station receiving a deletion acknowledgement message from the slave station.

In an exemplary embodiment, the master station performing key updating on the UE and slave stations of a second virtual cell includes: the master station changing the first current value of the first S counter to obtain a second current value of the first S counter and generating a second virtual cell key according to the second current value of the first S counter; and the master station sending a key updating request message to the slave stations of the second virtual cell and sending a second RRC connection reconfiguration message to the UE.

Herein the key updating request message includes the second virtual cell key and the second RRC connection reconfiguration message includes the second current value of the first S counter.

In an exemplary embodiment, the master station changing the first current value of the first S counter to obtain a second current value of the first S counter includes: the master station adding 1 to the first current value of the first S counter to obtain a second current value of the first S counter.

In an exemplary embodiment, the method further includes: the master station sending an event A5 to the UE; the master station receiving an A5 measurement report from the UE and sending a switching request message to a target master station corresponding to a cell identity carried in the A5 measurement report; and the master station receiving a switching command message from the target master station and sending a third RRC connection reconfiguration message to the UE.

Herein the switching request message includes the key from the core network, a current value of a Next Chaining Counter (NCC) and an encryption algorithm list, and the third RRC connection reconfiguration message includes a second encryption algorithm, a current value of a second S counter and the current value of the NCC.

In an exemplary embodiment, the third RRC connection reconfiguration message further includes a header compression algorithm.

In an exemplary embodiment, the method further includes: the target master station receiving the switching request message from the other master station, the target master station generating a third virtual cell key according to the switching request message from the master station and sending a deletion request message to a slave station of the target master station; the target master station receiving a deletion acknowledgement message from the slave station and sending a third adding request message to the slave station; and the target master station receiving a third adding command message from the slave station and sending a switching command message to the master station which sends the switching request message.

Herein the target master station and slave stations of the master station which sends the switching request message form a third virtual cell; and the third adding request message includes the second encryption algorithm and the third virtual cell key.

The embodiment of the present disclosure further provides a method for dynamically constructing a virtual cell, applied to an ultra-dense network, including:

User Equipment (UE) selecting a serving cell, using the selected serving cell as a master station and establishing a service on the master station; the UE receiving an event A4 from the master station and performing measurement on neighboring cells of the master station; when it is judged that there is a cell which satisfies the event A4 in the neighboring cells of the master station, the UE sending an A4 measurement report to the master station; and the UE receiving a first Radio Resource Control (RRC) connection reconfiguration message from the master station, generating a first encryption key according to the first RRC connection reconfiguration message, performing reestablishment by using the generated first encryption key, sending a first RRC connection reconfiguration completion message to the master station and initiating a random access process to a slave station.

In an exemplary embodiment, the A4 measurement report includes one or more cell identities of a cell/cells which satisfies/satisfy the event A4.

In an exemplary embodiment, the UE generating a first encryption key according to the first RRC connection reconfiguration message includes: the UE generating a first virtual cell key according to a first current value of a first S counter in the first RRC connection reconfiguration message and a key from a core network, and generating the first encryption key according to the generated first virtual cell key and a physical address of the UE by using a first encryption algorithm in the first RRC connection reconfiguration message.

In an exemplary embodiment, the method further includes: the UE receiving an event A2 from the master station; the UE performing measurement on slave stations in a first virtual cell; when it is judged that there is a cell which satisfies the event A2 in the slave stations of the first virtual cell, the UE sending an A2 measurement report to the master station; and the UE receiving a second RRC connection reconfiguration message from the master station, generating a second encryption key according to the second RRC connection reconfiguration message and performing reestablishment by using the generated second encryption key; and the UE sending a second RRC connection reconfiguration completion message to the master station.

In an exemplary embodiment, the UE generating a second encryption key according to the second RRC connection reconfiguration message includes: the UE generating a second virtual cell key according to a second current value of a first S counter in the second RRC connection reconfiguration message and a key from a core network, and generating the second encryption key according to the generated second virtual cell key and a physical address of the UE by using the first encryption algorithm.

In an exemplary embodiment, the method further includes: the UE receiving an event A5 from the master station; the UE performing measurement on neighboring cells of the master station; when it is judged that there is a cell which satisfies the event A5 in the neighboring cells of the master station, the UE sending an A5 measurement report to the master station; and the UE receiving a third RRC connection reconfiguration message from the master station, generating a third encryption key according to the third RRC connection reconfiguration message, performing reestablishment by using the generated third encryption key, sending a third RRC connection reconfiguration completion message to the target master station and initiating a random access process to a slave station.

In an exemplary embodiment, the UE generating a third encryption key according to the third RRC connection reconfiguration message includes: the UE generating a third virtual cell key according to a current value of a second S counter in the third RRC connection reconfiguration message, a key from a core network and a current value of a Next Chaining Counter (NCC), and generating the third encryption key according to the generated third virtual cell key and a physical address of the UE by using the second encryption algorithm.

The embodiment of the present disclosure further provides a method for dynamically constructing a virtual cell, applied to an ultra-dense network, including: a slave station receiving a first adding request message or a second adding request message from a master station, generating a first encryption key according to the first adding request message or the second adding request message and performing configuration by using the generated first encryption key; and the slave station sending a first adding command message or a second adding command message to the master station.

Herein the first adding command message includes a first encryption algorithm.

In an exemplary embodiment, generating a first encryption key according to the first adding request message includes: selecting the first encryption algorithm for UE from an encryption algorithm list in the first adding request message, and generating the first encryption key according to a first virtual cell key in the first adding request message and a physical address of the UE by using the first encryption algorithm.

Generating a first encryption key according to the second adding request message includes: generating the first encryption key according to a first virtual cell key in the second adding request message and the physical address of the UE by using the first encryption algorithm.

In an exemplary embodiment, the first adding command message or the second adding command message further includes a first current value of a first S counter in the first adding request message or the second adding request message.

In an exemplary embodiment, the method further includes: after a random access process initiated by the UE is completed, the slave station sending an adding completion message to the master station.

In an exemplary embodiment, the method further includes: the slave station receiving a deletion request message from the master station, the slave station releasing corresponding resources and sending a deletion acknowledgement message to the master station.

In an exemplary embodiment, the method further includes: the slave station receiving a third adding request message from a target master station, the slave station generating a third encryption key according to the third adding request message, performing configuration by using the generated third encryption key and sending a third adding command message to the target master station.

In an exemplary embodiment, the step of generating a third encryption key according to the third adding request message includes: generating the third encryption key according to a third virtual cell key in the third adding request message and a physical address of UE by using a second encryption algorithm in the third adding request message.

The embodiment of the present disclosure further provides a device for dynamically constructing a virtual cell, at least including: a first sending module arranged to send an event A4 to User Equipment (UE); a first receiving module arranged to receive an A4 measurement report from the UE; and an adding module arranged to add a cell corresponding to a cell identity carried in the A4 measurement report as a slave station.

Herein a master station and slave stations form a first virtual cell.

In an exemplary embodiment, the first sending module is further arranged to send an event A2 to the UE.

The first receiving module is further arranged to receive an A2 measurement report from the UE.

The device further includes: a deletion module arranged to delete a slave station corresponding to a slave station identity carried in the A2 measurement report; and perform key updating on the UE and slave stations of a second virtual cell.

Herein the master station and other slave stations except the deleted slave station in the first virtual cell form the second virtual cell.

In an exemplary embodiment, the first sending module is further arranged to send an event A5 to the UE; send a switching request message to a target master station corresponding to a cell identity carried in the A5 measurement report; and send a third RRC connection reconfiguration message to the UE; and the first receiving module is further arranged to receive an A5 measurement report from the UE; and receive a switching command message from the target master station.

Herein the switching request message includes a key from a core network, a current value of a Next Chaining Counter (NCC) and an encryption algorithm list, and the third RRC connection reconfiguration message includes a second encryption algorithm, a current value of a second S counter and the current value of the NCC.

The embodiment of the present disclosure further provides a device for dynamically constructing a virtual cell, at least including: a selection module arranged to select a serving cell, use the selected serving cell as a master station and establish a service on the master station; a second receiving module arranged to receive an event A4 from the master station and perform measurement on neighboring cells of the master station; and receive a first Radio Resource Control (RRC) connection reconfiguration message from the master station, generate a first encryption key according to the first RRC connection reconfiguration message and perform reestablishment by using the generated first encryption key; and a second sending module arranged to, when it is judged that there is a cell which satisfies the event A4 in the neighboring cells of the master station, send an A4 measurement report to the master station; and send a first RRC connection reconfiguration completion message to the master station and initiate a random access process to a slave station.

In an exemplary embodiment, the second receiving module is further arranged to receive an event A2 from the master station; perform measurement on slave stations in a first virtual cell; and receive a second RRC connection reconfiguration message from the master station, generate a second encryption key according to the second RRC connection reconfiguration message and perform reestablishment by using the generated second encryption key.

The second sending module is further arranged to: when it is judged that there is a cell which satisfies the event A2 in the slave stations of the first virtual cell, send an A2 measurement report to the master station; and send a second RRC connection reconfiguration completion message to the master station.

In an exemplary embodiment, the second receiving module is further arranged to receive an event A5 from the master station and perform measurement on neighboring cells of the master station; and receive a third RRC connection reconfiguration message from the master station, generate a third encryption key according to the third RRC connection reconfiguration message and perform reestablishment by using the generated third encryption key.

The second sending module is further arranged to: when it is judged that there is a cell which satisfies the event A5 in the neighboring cells of the master station, send an A5 measurement report to the master station; and send a third RRC connection reconfiguration completion message to the target master station and initiate a random access process to a slave station.

The embodiment of the present disclosure further provides device for dynamically constructing a virtual cell, at least including: a third receiving module arranged to receive a first adding request message or a second adding request message from a master station, generate a first encryption key according to the first adding request message or the second adding request message and perform configuration by using the generated first encryption key; and a third sending module arranged to send a first adding command message or a second adding command message to the master station, herein the first adding command message includes a first encryption algorithm.

In an exemplary embodiment, the third sending module is further arranged to, after a random access process initiated by the UE is completed, send an adding completion message to the master station.

In an exemplary embodiment, the third receiving module is further arranged to receive a deletion request message from the master station; and the third sending module is further arranged to release corresponding resources and send a deletion acknowledgement message to the master station.

In an exemplary embodiment, the third receiving module is further arranged to receive a third adding request message from a target master station; and generate a third encryption key according to the third adding request message and perform configuration by using the generated third encryption key; and the third sending module is further arranged to send a third adding command message to the target master station.

The embodiment of the present disclosure further provides a computer storage medium, storing computer-executable instructions used for executing an above-mentioned method.

Compared with the related art, the method provided by the embodiment of the present disclosure includes: a master station sending an event A4 to UE and receiving an A4 measurement report from the UE; and the master station adding cells corresponding to cell identities carried in the A4 measurement report as slave stations one by one, herein the master station and slave stations form a first virtual cell. In the solution provided by the embodiment of the present disclosure, a serving cell selected by UE may be any cell and is not necessary to be a macro cell, the master station adds a cell which satisfies an event A4 as a slave station and thereby a soft cell is realized.

DETAILED DESCRIPTION

In order to facilitate the understanding of one skilled in the art, embodiments of the present disclosure will be further described below with reference to the drawings. However, embodiments of the present disclosure should not be used for limiting the protection scope of the present disclosure. It needs to be stated that embodiments in the present application and various modes in the embodiments may be mutually combined under the situation of no conflict.

Figure 1:
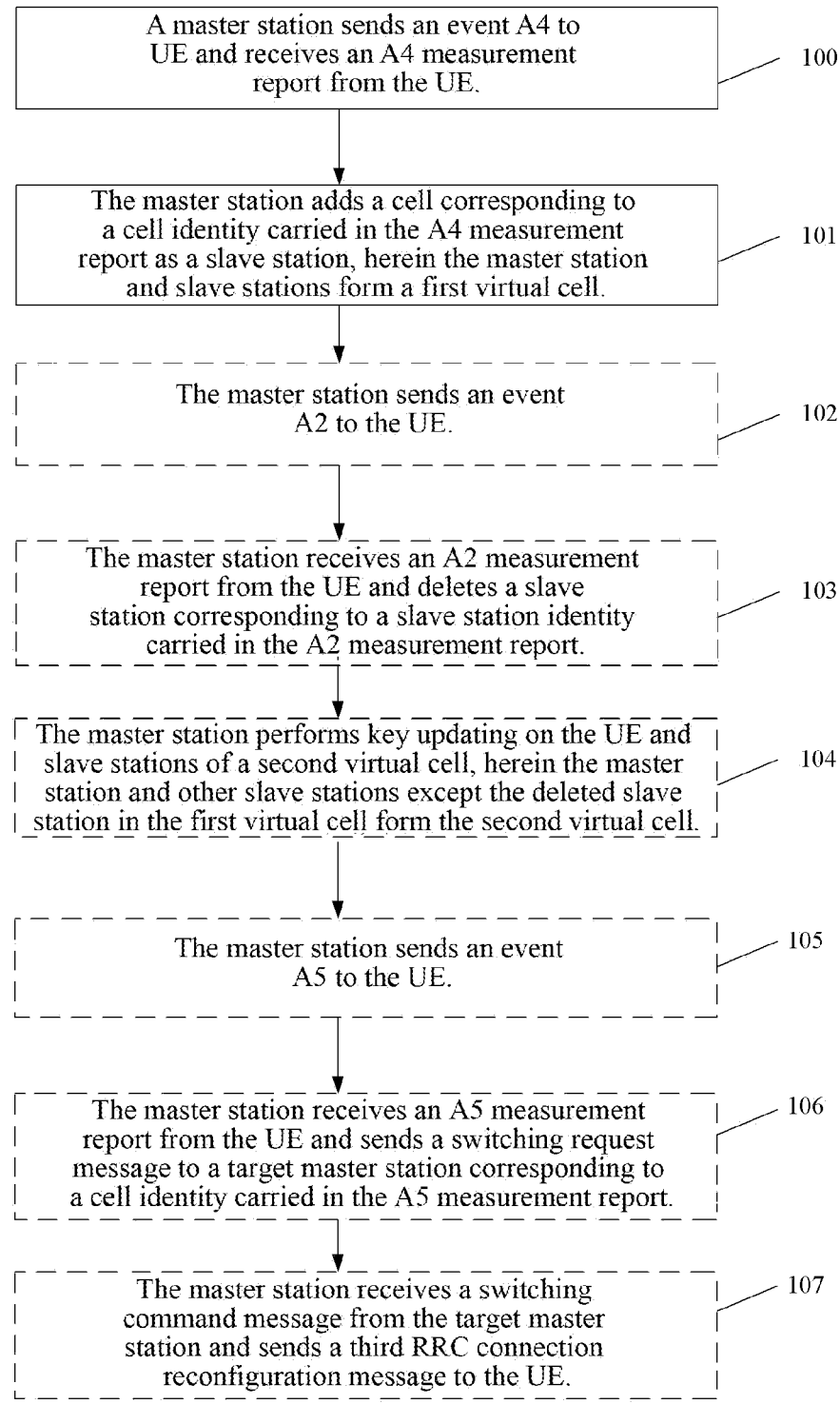
FIG. 1 illustrates a flowchart of a method for dynamically constructing a virtual cell applied to UE according to an embodiment of the present disclosure.

Referring to FIG. 1, an embodiment of the present disclosure provides a method for dynamically constructing a virtual cell, applied to an ultra-dense network, including the following steps.

In step 100, a master station sends an event A4 to UE and receives an A4 measurement report from the UE.

In this step, after UE selects a serving cell as a master station and establishes a service on the master station, the master station sends an event A4 for performing measurement on neighboring cells of the master station to the UE.

In step 101, the master station adds a cell corresponding to a cell identity carried in the A4 measurement report as a slave station, herein the master station and slave stations form a first virtual cell.

In this step, that the master station adds a cell corresponding to a cell identity carried in the A4 measurement report as a slave station includes that: the master station generates a first virtual cell key according to a first current value of a first S counter and a key from a core network; the master station acquires the cell corresponding to the cell identity in the A4 measurement report, uses the acquired cell as a slave station and sends a first adding request message to one of slave stations; the master station receives a first adding command message from the slave station, generates a first encryption key according to the first adding command message and sends a first Radio Resource Control (RRC) connection reconfiguration message to the UE; and the master station receives a first RRC connection reconfiguration completion message from the UE.

Herein, the first adding request message includes the first virtual cell key and an encryption algorithm list; the first RRC connection reconfiguration message includes a first encryption algorithm in the first adding command message and the first current value of the first S counter; and the first adding command message includes the first encryption algorithm.

Herein, the first adding request message may further include UE capability information, the first current value of the first S counter, a header compression algorithm and a UE identity. The first RRC connection reconfiguration message may further include the header compression algorithm.

That the master station adds a cell corresponding to a cell identity carried in the A4 measurement report as a slave station may further include that:

The master station sends a second adding request message to other slave stations of the first virtual cell; and the master station receives second adding command messages from the other slave stations of the first virtual cell.

Herein, the second adding request message includes the first virtual cell key and the first encryption algorithm. The second adding request message may further include UE capability information, the first current value of the first S counter, a header compression algorithm and a UE identity.

The first RRC connection reconfiguration message further includes the header compression algorithm.

The master station receives a random access process initiated by the slave station, and after the random access process is completed, the master station receives an adding completion message from the slave station. When the master station receives the adding completion message from the slave station, the method further includes the following step.

The master station sends a first path switching request message to a Mobility Management Entity (MME) and receives a first path switching acknowledgement message from the MME.

Herein, the first path switching request message includes a first virtual cell identity, a master station identity of a master station in the first virtual cell and slave station identities of slave stations in the first virtual cell.

The method further includes the following steps.

In step 102, the master station sends an event A2 to the UE.

In this step, the master station may periodically send the event A2 to the UE.

In step 103, the master station receives an A2 measurement report from the UE and deletes a slave station corresponding to a slave station identity carried in the A2 measurement report.

In this step, that the master station deletes a slave station corresponding to a slave station identity carried in the A2 measurement report includes the following act: the master station sends a deletion request message to the slave station corresponding to the slave station identity carried in the A2 measurement report; and the master station receives a deletion acknowledgement message from the slave station.

In step 104, the master station performs key updating on the UE and slave stations of a second virtual cell, herein the master station and other slave stations except the deleted slave station in the first virtual cell form the second virtual cell.

In this step, that the master station performs key updating on the UE and slave stations of a second virtual cell includes the following acts: the master station changes the first current value of the first S counter to obtain a second current value of the first S counter and generates a second virtual cell key according to the second current value of the first S counter, the master station sends a key updating request message to the slave stations of the second virtual cell and sends a second RRC connection reconfiguration message to the UE.

Herein, the key updating request message includes the second virtual cell key and the second RRC connection reconfiguration message includes the second current value of the first S counter.

Herein, that the master station changes the first current value of the first S counter to obtain a second current value of the first S counter includes the following act: the master station adds 1 to the first current value of the first S counter to obtain a second current value of the first S counter.

The method further includes the following steps.

In step 105, the master station sends an event A5 to the UE.

In step 106, the master station receives an A5 measurement report from the UE and sends a switching request message to a target master station corresponding to a cell identity carried in the A5 measurement report.

In this step, the switching request message includes the key from the core network, a current value of a Next Chaining Counter (NCC) and an encryption algorithm list.

In step 107, the master station receives a switching command message from the target master station and sends a third RRC connection reconfiguration message to the UE.

In this step, the third RRC connection reconfiguration message includes a second encryption algorithm, a current value of a second S counter and the current value of the NCC. The third RRC connection reconfiguration message may further include the header compression algorithm.

The method further includes the following steps.

When the target master station receives the switching request message from the master station, the target master station generates a third virtual cell key according to the switching request message from the master station and sends a deletion request message to a slave station of the target master station; the target master station receives a deletion acknowledgement message from the slave station and sends a third adding request message to the slave station; the slave station of the target master station generates a third encryption key according to the third adding command message; and the target master station receives the third adding command message sent by the slave station and sends a switching command message to the master station which sends the switching request message, herein the target master station and slave stations of the master station which sends the switching request message form a third virtual cell; and the third adding request message includes the second encryption algorithm and the third virtual cell key.

Figure 2:
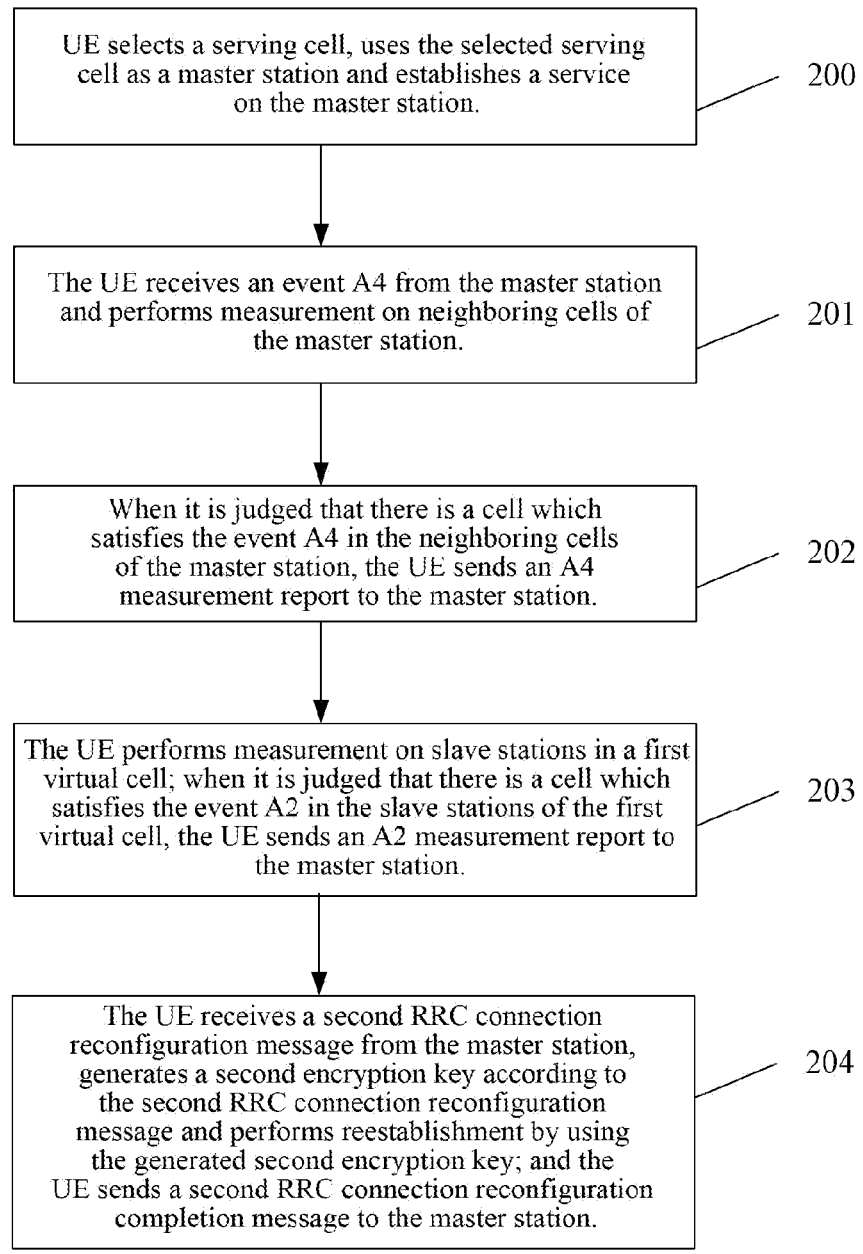
FIG. 2 illustrates a flowchart of a method for dynamically constructing a virtual cell applied to a master station according to an embodiment of the present disclosure.

Refer to FIG. 2, the embodiment of the present disclosure provides a method for dynamically constructing a virtual cell, applied to an ultra-dense network, including the following steps.

In step 200, UE selects a serving cell, uses the selected serving cell as a master station and establishes a service on the master station.

In step 201, the UE receives an event A4 from the master station and performs measurement on neighboring cells of the master station.

In this step, the UE may measure Reference Signal Receiving Power (RSRP) of the neighboring cells of the master station. A threshold of the event A4 may be −90 dBm and a value range may be −140 dBm to −25 dBm; and a threshold of an event A5 may be −100 dBm to −90 dBm and a value range may be −140 dBm to −25 dBm.

The UE may also measure Reference Signal Receiving Quality (RSRQ) of the neighboring cells of the master station. A threshold of the event A4 may be −12 dB and a value range may be −20 dB to 0 dB; and a threshold of an event A5 may be −16 dB to −12 dB and a value range may be −20 dB to 0 dB.

In step 202, when it is judged that there is a cell which satisfies the event A4 in the neighboring cells of the master station, the UE sends an A4 measurement report to the master station.

In this step, the A4 measurement report includes one or more cell identities of a cell/cells which satisfies/satisfy the event A4.

In step 203, the UE receives a first RRC connection reconfiguration message from the master station, generates a first encryption key according to the first RRC connection reconfiguration message, performs reestablishment by using the generated first encryption key; and the UE sends a first RRC connection reconfiguration completion message to the master station and initiates a random access process to a slave station.

In this step, that the UE generates a first encryption key according to the first RRC connection reconfiguration message includes the following act: the UE generates a first virtual cell key according to a first current value of a first S counter in the first RRC connection reconfiguration message and a key from a core network, and generates the first encryption key according to the generated first virtual cell key and a physical address of the UE by using a first encryption algorithm in the first RRC connection reconfiguration message.

Herein, the physical address of the UE may be an International Mobile Subscriber Identification Number (IMSI) of the UE.

Herein, the UE may perform reestablishment by using the generated first encryption key on a Packet Data Convergence Protocol (PDCP) layer.

A slave station identity may be a cell identity corresponding to a slave station.

When the UE receives an event A2 from the master station, the method further includes the following steps.

In step 203, the UE performs measurement on slave stations in a first virtual cell; when it is judged that there is a cell which satisfies the event A2 in the slave stations of the first virtual cell, the UE sends an A2 measurement report to the master station.

In this step, the A2 measurement report includes one or more slave station identifies of a slave station/slave stations which satisfies/satisfy the event A2.

In this step, UE may perform measurement on RSRP of the slave station. Thus, a threshold of the event A2 may be −100 dBm and a value range may be −140 dBm to −25 dBm.

The UE may also perform measurement on RSRQ of the slave station. Thus, a threshold of the event A2 may be −16 dB and a value range may be −20 dB to 0 dB.

In step 204, the UE receives a second RRC connection reconfiguration message from the master station, generates a second encryption key according to the second RRC connection reconfiguration message and performs reestablishment by using the generated second encryption key; and the UE sends a second RRC connection reconfiguration completion message to the master station.

In this step, that the UE generates a second encryption key according to the second RRC connection reconfiguration message includes the following act: the UE generates a second virtual cell key according to a second current value of a first S counter in the second RRC connection reconfiguration message and a key from a core network, and generates the second encryption key according to the generated second virtual cell key and a physical address of the UE by using the first encryption algorithm.

Herein, the UE may perform reestablishment by using the generated second virtual cell key on a PDCP layer.

When the UE receives an event A5 from the master station, the method further includes the following act: the UE performs measurement to neighboring cells of the master station; when it is judged that there is a cell which satisfies the event A5 in the neighboring cells of the master station, the UE sends an A5 measurement report to the master station; and the UE receives a third RRC connection reconfiguration message from the master station, generates a third encryption key according to the third RRC connection reconfiguration message, performs reestablishment by using the generated third encryption key, sends a third RRC connection reconfiguration completion message to the target master station and initiates a random access process to a slave station.

Herein, that the UE generates a third encryption key according to the third RRC connection reconfiguration message includes the following act: the UE generates a third virtual cell key according to a current value of a second S counter in the third RRC connection reconfiguration message, a key from a core network and a current value of an NCC, and generates the third encryption key according to the generated third virtual cell key and a physical address of the UE by using the second encryption algorithm.

Herein, the UE may perform reestablishment by using the generated third encryption key on a PDCP layer.

Figure 3:
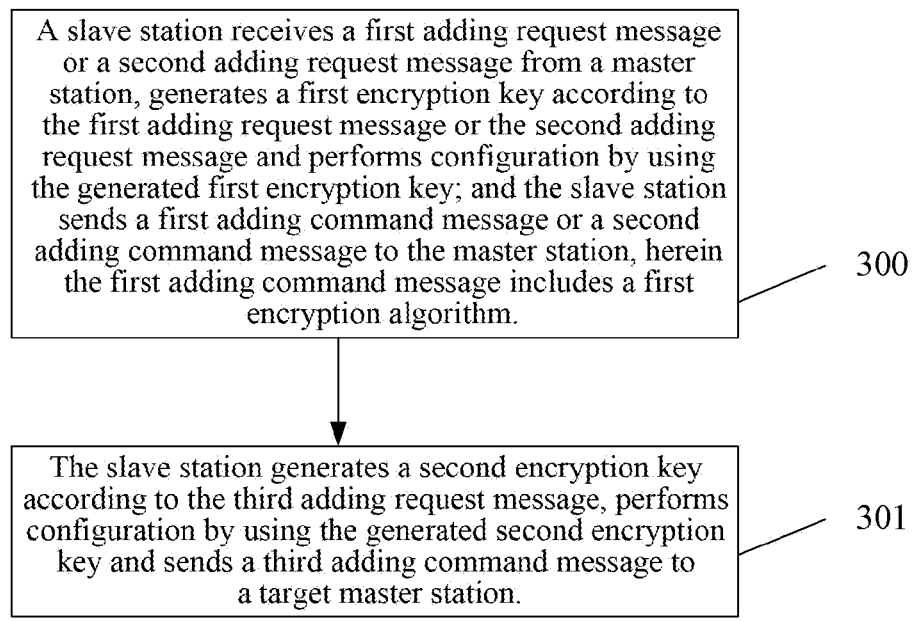
FIG. 3 illustrates a flowchart of a method for dynamically constructing a virtual cell applied to a slave station according to an embodiment of the present disclosure.

Refer to FIG. 3. The embodiment of the present disclosure provides a method for dynamically constructing a virtual cell, applied to an ultra-dense network, including the following steps.

In step 300, a slave station receives a first adding request message or a second adding request message from a master station, generates a first encryption key according to the first adding request message or the second adding request message and performs configuration by using the generated first encryption key; and the slave station sends a first adding command message or a second adding command message to the master station, herein the first adding command message includes a first encryption algorithm.

Generating a first encryption key according to the first adding request message includes the following act: the first encryption algorithm is selected for UE from an encryption algorithm list in the first adding request message, and the first encryption key is generated according to a first virtual cell key in the first adding request message and a physical address of the UE by using the first encryption algorithm.

Generating a first encryption key according to the second adding request message includes the following act: the first encryption key is generated according to the first virtual cell key in the second adding request message and the physical address of the UE by using the first encryption algorithm.

The first adding command message or the second adding command message further includes a first current value of a first S counter in the first adding request message or the second adding request message.

After a random access process initiated by UE is completed, the method further includes the following act: the slave station sends an adding completion message to the master station.

When the slave station receives a deletion request message from the master station, the method further includes the following act: the slave station releases corresponding resources and sends a deletion acknowledgement message to the master station.

When the slave station receives a third adding request message from a target master station, the method further includes the following step.

In step 301, the slave station generates a third encryption key according to the third adding request message, performs configuration by using the generated third encryption key and sends a third adding command message to a target master station.

In this step, generating a third encryption key according to the third adding request message includes the following act: the third encryption key is generated according to a third virtual cell key in the third adding request message and a physical address of UE by using a second encryption algorithm in the third adding request message.

The method for dynamically constructing the virtual cell will be described below through embodiments.

Figure 4:
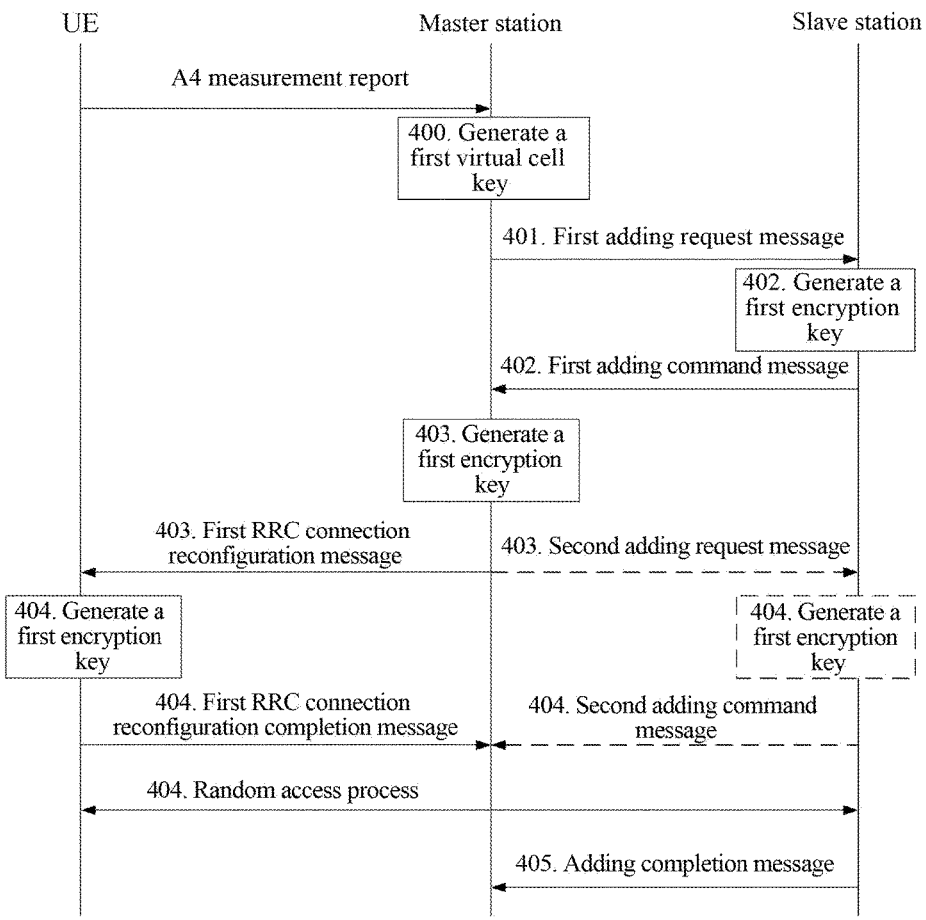
FIG. 4 illustrates a flowchart of a method for adding a slave station of a master station according to an embodiment of the present disclosure.

Embodiment one: referring to FIG. 4, after a master station receives an A4 measurement report from UE, a method for adding a slave station of a master station includes the following steps.

In step 400, a master station generates a first virtual cell key according to a key from a core network and a first current value of a first S counter.

In step 401, the master station uses a cell corresponding to a cell identity carried in the A4 measurement report as a slave station and sends a first adding request message to one of slave stations.

In this step, the first adding request message includes the first virtual cell key and an encryption algorithm list. The first adding request message may further include UE capability information, the first current value of the first S counter, a header compression algorithm and a UE identity.

In step 402, the slave station selects a first encryption algorithm for the UE from the encryption algorithm list in the first adding request message, generates a first encryption key according to a first virtual cell key in the first adding request message and a physical address of the UE by using the first encryption algorithm, and sends a first adding command message to the master station.

In this step, the first adding command message includes the first encryption algorithm. The first adding command message may further includes the first current value of the first S counter.

In step 403, the master station generates a first encryption key according to the first adding command message, sends a first RRC connection reconfiguration message to the UE and sends a second adding request message to other slave stations.

In this step, the first RRC connection reconfiguration message includes the first encryption algorithm and the first current value of the first S counter. The first RRC connection reconfiguration message may further includes the header compression algorithm and the first current value of the first S counter.

In this step, the second adding request message includes the first encryption algorithm.

In step 404, the UE generates a first encryption key according to the first RRC connection reconfiguration message and performs reestablishment by using the generated first encryption key; the UE sends a first RRC connection reconfiguration completion message to the master station and sends an access request message to a slave station.

Other slave stations generate a first encryption key according to the second adding request message and performs configuration by using the generated first encryption key, and other slave stations send a second adding command message to the master station; and the slave station initiates a random access process to the master station.

In step 405, after the random access process is completed, the slave station sends an adding completion message to the master station.

In step 406, the master station sends a path switching request message to an MME (not shown).

In this step, the first path switching request message includes a first virtual cell identity, a master station identity of a master station in a first virtual cell and slave station identities of slave stations in the first virtual cell.

In step 407, the MME sends a path switching acknowledgement message to the master station (not shown).

Figure 5:
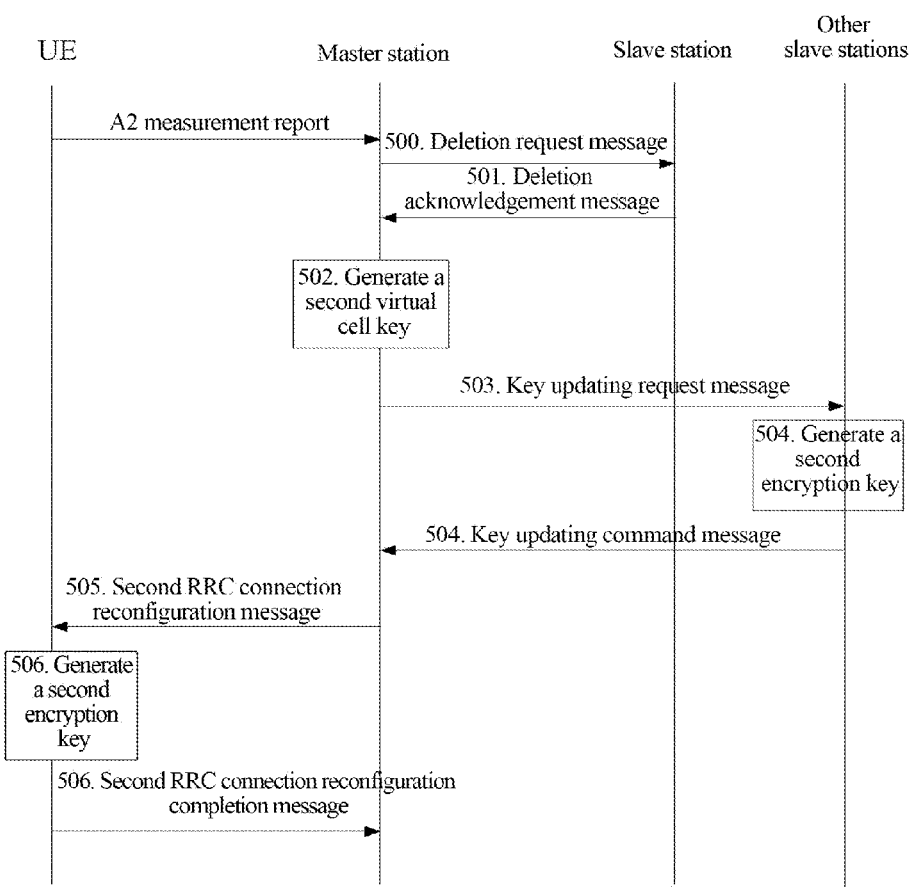
FIG. 5 illustrates a flowchart of a method for deleting a slave station of a master station according to an embodiment of the present disclosure.

Embodiment two: referring to FIG. 5, after a master station receives an A2 measurement report from UE, a method for deleting a slave station of a master station includes the following steps.

In step 500, a master station sends a deletion request message to a slave station corresponding to a cell identity carried in an A2 measurement report.

In step 501, the slave station releases corresponding resources and sending a deletion acknowledgement message to the master station.

In step 502, the master station adds 1 to a first current value of a first S counter to obtain a second current value of the first S counter, and generates a second virtual cell key according to the second current value and a key from a core network.

In step 503, the master station sends a key updating request message to other slave stations except the deleted slave station.

In this step, the key updating request message includes the second virtual cell key. The key updating request message may further includes UE capability information, the second current value of the first S counter, a header compression algorithm and a UE subscriber identity.

In step 504, the other slave stations generate a second encryption key according to the key updating request message, perform configuration by using the generated second encryption key and send a key updating command message to the master station.

In this step, generating a second encryption key according to the key updating request message includes the following act: a second encryption key is generated according to the second virtual cell key in the key updating request message and a physical address of UE by using a first encryption algorithm.

In step 505, the master station sends a second RRC connection reconfiguration message to the UE.

In this step, the second RRC connection reconfiguration message includes the second current value of the first S counter. The second RRC connection reconfiguration message may further include the header compression algorithm.

In step 506, the UE generates a second encryption key according to the second RRC connection reconfiguration message and performs reestablishment by using the generated second encryption key; and the UE sends a second RRC connection reconfiguration completion message to the master station and initiates a random access process to a slave station.

In this step, that the UE generates a second encryption key according to the second RRC connection reconfiguration message includes the following acts: the UE generates a second virtual cell key according to the second current value of the first S counter in the second RRC connection reconfiguration message and the key from the core network, and generates a second encryption key according to the generated second virtual cell key and a physical address of the UE by using the first encryption algorithm.

Herein, the UE may perform reestablishment by using the generated second virtual cell key on a PDCP layer.

In step 507, after the random access process is completed, the slave station sends an adding completion message to the master station (not shown).

In step 508, the master station sends a second path switching request message to an MME (not shown).

In this step, the second path switching request message includes a second virtual cell identity, a master station identity of the master station in a second virtual cell and slave station identities of slave stations in the second virtual cell.

In step 509, the MME sends a second path switching acknowledgement message to the master station (not shown).

Figure 6:
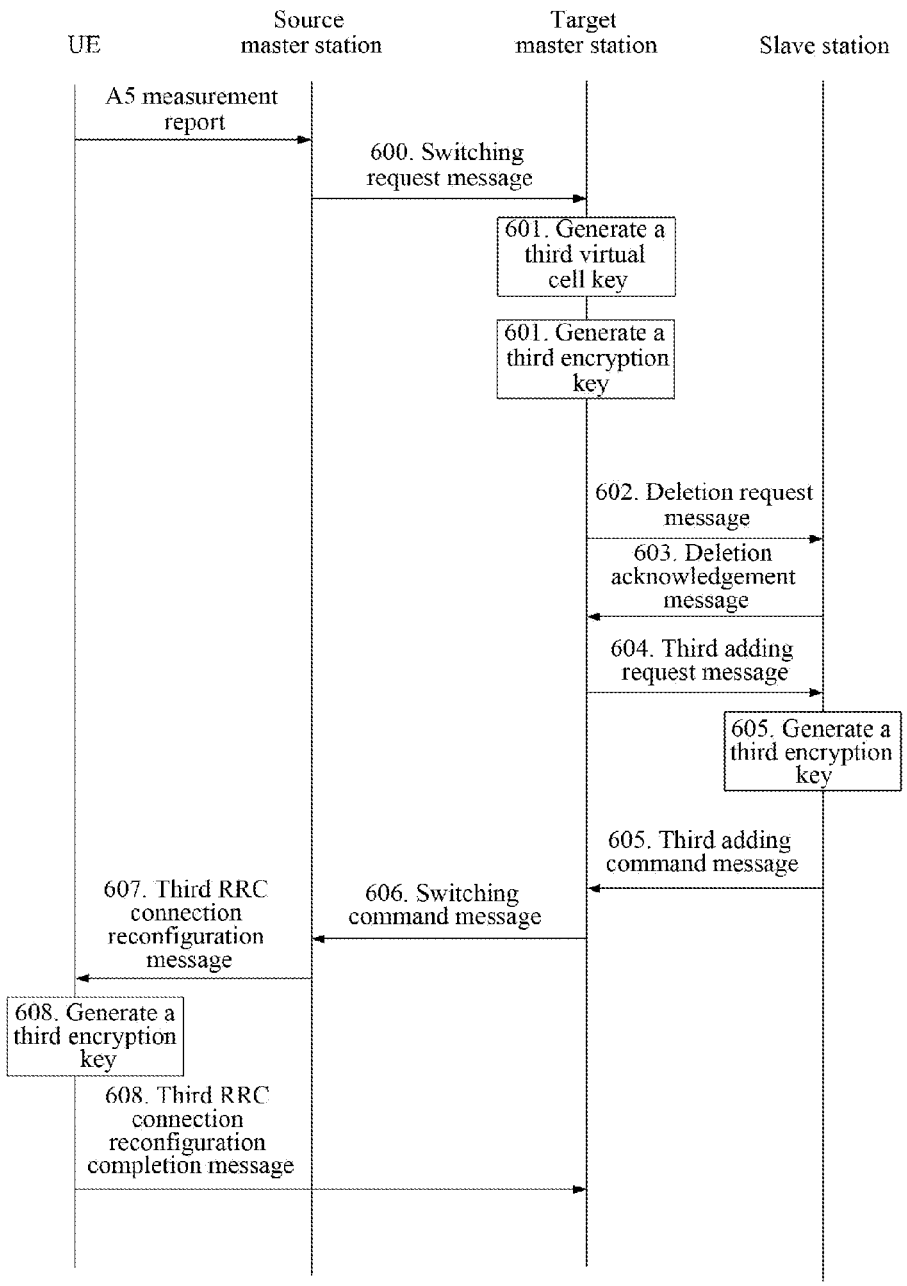
FIG. 6 illustrates a flowchart of a method for switching a master station according to an embodiment of the present disclosure.

Embodiment three: referring to FIG. 6, after a source master station receives an A5 measurement report from UE, a method for switching a master station includes the following steps.

In step 600, a source master station sends a switching request message to a target master station corresponding to a cell identity carried in an A5 measurement report.

In this step, the switching request message includes a key from a core network, a current value of an NCC and an encryption algorithm list.

In step 601, the target master station selects a second encryption algorithm from the encryption algorithm list, creates a second S counter, generates a third virtual cell key according to a current value of the second S counter, the key from the core network and the current value of the NCC, generates a third encryption key according to the generated third virtual cell key and a physical address of the UE by using the second encryption algorithm, and generates a UE context according to the switching request message.

In step 602, the target master station sends a deletion request message to a slave station.

In step 603, the slave station sends a deletion acknowledgement message to the target master station.

In step 604, the target master station sends a third adding request message to the slave station.

In this step, the third adding request message includes the second encryption algorithm and the third virtual cell key.

In step 605, the slave station generates a third encryption key according to the fifth adding request message, performs configuration by using the generated third encryption key and sends a third adding command message to the target master station.

In this step, generating a third encryption key according to the third adding request message includes the following act: a third encryption key is generated according to the third virtual cell key in the third adding request message and a physical address of the UE by using the second encryption algorithm in the third adding request message.

In step 606, the target master station sends a switching command message to the source master station.

In this step, the switching command message includes release/increase configuration information of a slave station, the second encryption algorithm and the current value of the second S counter.

In step 607, the source master station sends a third RRC connection reconfiguration message to the UE.

In this step, the third RRC connection reconfiguration message includes the second encryption algorithm, the current value of the second S counter and the current value of the NCC. The third RRC connection reconfiguration message may further include the header compression algorithm.

In step 608, the UE generates a third encryption key according to the third RRC connection reconfiguration message and performs reestablishment by using the generated third encryption key; and the UE sends a third RRC connection reconfiguration completion message to the target master station.

In this step, that the UE generates a third encryption key according to the third RRC connection reconfiguration message includes the following act: the UE generates a third virtual cell key according to the current value of the second S counter in the third RRC connection reconfiguration message, the current value of the NCC and the key from the core network, and generates the third encryption key according to the generated third virtual cell key and a physical address of the UE by using the second encryption algorithm in the third RRC connection reconfiguration message.

In this step, the UE may perform reestablishment by using the generated third encryption key on a PDCP layer.

Figure 7:
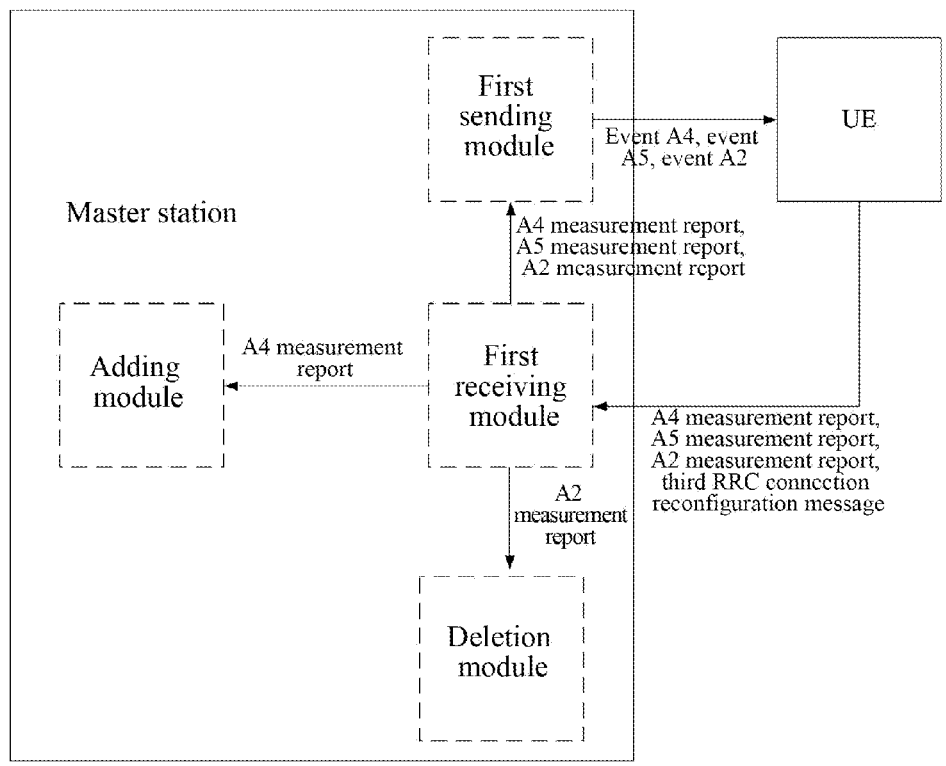
FIG. 7 illustrates a schematic diagram of structural components of a first device (UE) for dynamically constructing a virtual cell according to an embodiment of the present disclosure.

Refer to FIG. 7. The embodiment of the present disclosure further provides a device for dynamically constructing a virtual cell, at least including the following modules.

A first sending module is arranged to send an event A4 to UE.

A first receiving module is arranged to receive an A4 measurement report from the UE.

An adding module is arranged to add a cell corresponding to a cell identity carried in the A4 measurement report as a slave station.

Herein a master station and slave stations form a first virtual cell.

In the device provided by the embodiment of the present disclosure, the first sending module is further arranged to send an event A2 to the UE.

The first receiving module is further arranged to receive an A2 measurement report from the UE.

The device further includes: a deletion module arranged to delete a slave station corresponding to a slave station identity carried in the A2 measurement report; and perform key updating on the UE and slave stations of a second virtual cell.

Herein the master station and other slave stations except the deleted slave station in the first virtual cell form the second virtual cell.

In the device provided by the embodiment of the present disclosure, the first sending module is further arranged to send an event A5 to the UE; send a switching request message to a target master station corresponding to a cell identity carried in the A5 measurement report; and send a third RRC connection reconfiguration message to the UE.

The first receiving module is further arranged to receive an A5 measurement report from the UE; and receive a switching command message from the target master station.

Herein the switching request message includes a key from a core network, a current value of an NCC and an encryption algorithm list, and the third RRC connection reconfiguration message includes a second encryption algorithm, a current value of a second S counter and the current value of the NCC.

Figure 8:
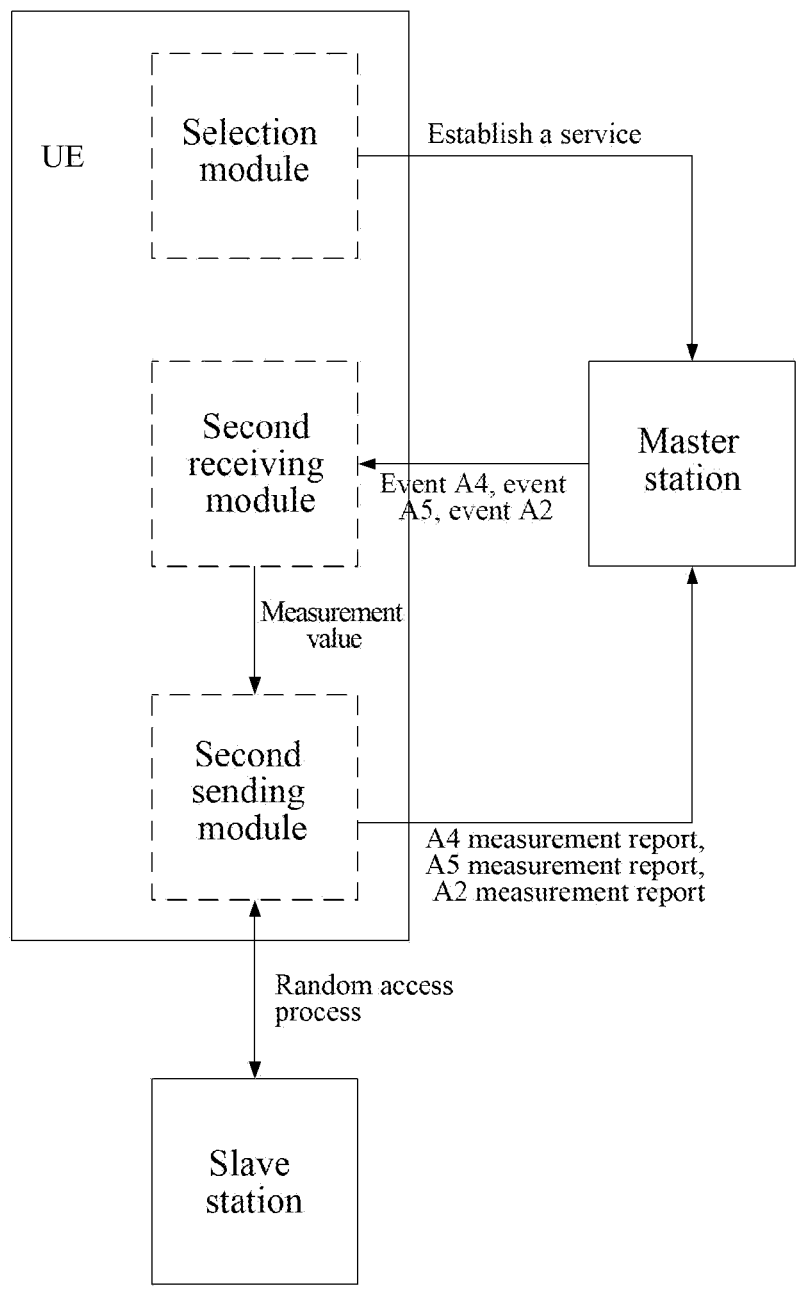
FIG. 8 illustrates a schematic diagram of structural components of a second device (master station) for dynamically constructing a virtual cell according to an embodiment of the present disclosure.

Refer to FIG. 8, the embodiment of the present disclosure further provides a device for dynamically constructing a virtual cell, at least including the following modules.

A selection module is arranged to select a serving cell, use the selected serving cell as a master station and establish a service on the master station.

A second receiving module is arranged to receive an event A4 from the master station and perform measurement on neighboring cells of the master station; and receive a first Radio Resource Control RRC connection reconfiguration message from the master station, generate a first encryption key according to the first RRC connection reconfiguration message and perform reestablishment by using the generated first encryption key; and A second sending module is arranged to, when it is judged that there is a cell which satisfies the event A4 in the neighboring cells of the master station, send an A4 measurement report to the master station; and send a first RRC connection reconfiguration completion message to the master station and initiate a random access process to a slave station.

In the device provided by the embodiment of the present disclosure, the second receiving module is further arranged to receive an event A2 from the master station; perform measurement on slave stations in a first virtual cell; and receive a second RRC connection reconfiguration message from the master station, generate a second encryption key according to the second RRC connection reconfiguration message and perform reestablishment by using the generated second encryption key.

The second sending module is further arranged to: when it is judged that there is a cell which satisfies the event A2 in the slave stations of the first virtual cell, send an A2 measurement report to the master station; and send a second RRC connection reconfiguration completion message to the master station.

In the device provided by the embodiment of the present disclosure, the second receiving module is further arranged to receive an event A5 from the master station and perform measurement on neighboring cells of the master station; and receive a third RRC connection reconfiguration message from the master station, generate a third encryption key according to the third RRC connection reconfiguration message and perform reestablishment by using the generated third encryption key.

The second sending module is further arranged to: when it is judged that there is a cell which satisfies the event A5 in the neighboring cells of the master station, send an A5 measurement report to the master station; and send a third RRC connection reconfiguration completion message to the target master station and initiate a random access process to a slave station.

Figure 9:
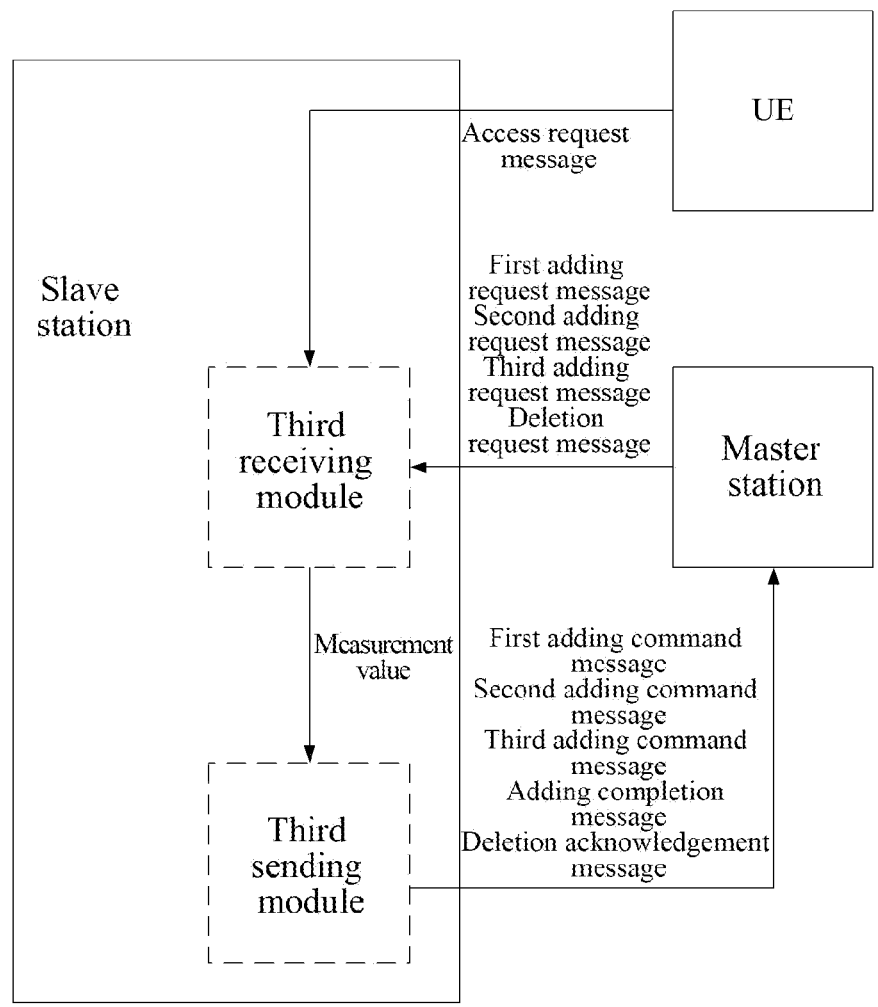
FIG. 9 illustrates a schematic diagram of structural components of a third device (slave station) for dynamically constructing a virtual cell according to an embodiment of the present disclosure.

Refer to FIG. 9. The embodiment of the present disclosure further provides a device for dynamically constructing a virtual cell, at least including the following modules.

A third receiving module is arranged to: receive a first adding request message or a second adding request message from a master station, generate a first encryption key according to the first adding request message or the second adding request message and perform configuration by using the generated first encryption key.

A third sending module is arranged to: send a first adding command message or a second adding command message to the master station, herein the first adding command message includes a first encryption algorithm.

In the device provided by the embodiment of the present disclosure, the third sending module is further arranged to, after a random access process initiated by the UE is completed, send an adding completion message to the master station.

In the device provided by the embodiment of the present disclosure, the third receiving module is further arranged to receive a deletion request message from the master station.

The third sending module is further arranged to release corresponding resources and send a deletion acknowledgement message to the master station.

In the device provided by the embodiment of the present disclosure, the third receiving module is further arranged to receive a third adding request message from a target master station; and generate a third encryption key according to the third adding request message and perform configuration by using the generated third encryption key.

The third sending module is further arranged to send a third adding command message to the target master station.

It needs to be stated that the above-mentioned embodiments are just used for facilitating the understanding of one skilled in the art instead of limiting the protection scope of the present disclosure.

One skilled in the art can understand that all or partial steps in the above-mentioned embodiments may be implemented by using a computer program process, the computer program may be stored in a computer-readable storage medium, the computer program is executed on a corresponding hardware platform (e.g., a system, equipment, an apparatus or a device), and when being executed, it includes one or combinations of the steps of the method embodiments.

Alternatively, all or partial steps in the above-mentioned embodiments may also be implemented by using integrated circuits, and these steps may be respectively manufactured into integrated circuit modules, or more modules or steps thereof may be manufactured into a single integrated circuit module to implement.

Each device/function module/function unit in the above-mentioned embodiments may be implemented by using a general-purpose computing device, and they may be integrated on a single computing device and may also be distributed on a network consisting of a plurality of computing devices.

When each device/function module/function unit in the above-mentioned embodiments is implemented by means of software function module and is sold or used as an independent product, it may be stored in a computer-readable storage medium. The above-mentioned computer-readable storage medium may be a read-only memory, a magnetic disk, a compact disk or the like.

INDUSTRIAL APPLICABILITY

By using the above-mentioned solution, a serving cell selected by UE may be any cell and is not necessary to be a macro cell, the master station adds a cell which satisfies an event A4 as a slave station and thereby a soft cell is realized.

What is claimed is:
1. A method for dynamically constructing a virtual cell, applied to an ultra-dense network, comprising:
a master station sending an event A4 to User Equipment, UE, and receiving an A4 measurement report from the UE; and
the master station adding a cell corresponding to a cell identity carried in the A4 measurement report as a slave station,
wherein the master station and slave stations form a first virtual cell,
wherein the master station adding a cell corresponding to a cell identity carried in the A4 measurement report as a slave station comprises:
the master station generating a first virtual cell key according to a first current value of a first S counter and a key from a core network;

the master station acquiring the cell corresponding to the cell identity in the A4 measurement report, using the acquired cell as a slave station and sending a first adding request message to one of the slave stations;

the master station receiving a first adding command message from the slave station, generating a first encryption key according to the first adding command message and sending a first Radio Resource Control, RRC, connection reconfiguration message to the UE; and the master station receiving a first Radio Resource Control, RRC, connection reconfiguration completion message from the UE, wherein the first adding request message comprises the first virtual cell key and an encryption algorithm list the first adding command message comprises a first encryption algorithm; and the first RRC connection reconfiguration message comprises the first encryption algorithm in the first adding command message and a first current value of the first S counter, and the master station adding a cell corresponding to a cell identity carried in the A4 measurement report as a slave station further comprises:

the master station sending a second adding request message to other slave stations of the first virtual cell; and the master station receiving second adding command messages from the other slave stations of the first virtual cell, wherein the second adding request message comprises the first virtual cell key and the first encryption algorithm, or, the method further comprises:

the master station sending an event A2 to the UE;

the master station receiving an A2 measurement report from the UE and deleting a slave station corresponding to a slave station identity carried in the A2 measurement report; and the master station performing key updating on the UE and slave stations of a second virtual cell, wherein the master station and other slave stations except the deleted slave station in the first virtual cell form the second virtual cell, wherein the master station deleting a slave station corresponding to a slave station identity carried in the A2 measurement report comprises:

the master station sending a deletion request message to the slave station corresponding to the slave station identity carried in the A2 measurement report; and the master station receiving a deletion acknowledgement message from the slave station, and the master station performing key updating on the UE and slave stations of a second virtual cell comprises:

the master station changing the first current value of the first S counter to obtain a second current value of the first S counter and generating a second virtual cell key according to the second current value of the first S counter; and the master station sending a key updating request message to the slave stations of the second virtual cell and sending a second RRC connection reconfiguration message to the UE, wherein the key updating request message comprises the second virtual cell key and the second RRC connection reconfiguration message comprises the second current value of the first S counter, wherein the master station changing the first current value of the first S counter to obtain a second current value of the first S counter comprises: the master station adding 1 to the first current value of the first S counter to obtain a second current value of the first S counter, or, the method further comprises:

the master station sending an event A5 to the UE;

the master station receiving an A5 measurement report from the UE and sending a switching request message to a target master station corresponding to a cell identity carried in the A5 measurement report; and the master station receiving a switching command message from the target master station and sending a third RRC connection reconfiguration message to the UE, wherein the switching request message comprises the key from the core network, a current value of a Next Chaining Counter, NCC, and an encryption algorithm list, and the third RRC connection reconfiguration message comprises a second encryption algorithm, a current value of a second S counter and the current value of the NCC, and the third RRC connection reconfiguration message further comprises a header compression algorithm.

2. The method according to claim 1, wherein the first adding request message or the second adding request message further comprises UE capability information, the first current value of the first S counter, a header compression algorithm and a UE identity; and the first RRC connection reconfiguration message further comprises the header compression algorithm, and, wherein the first virtual cell key is generated by the master station according to the key from the core network and the first current value of the first S counter.

3. The method according to claim 1, wherein the method further comprises:

after the master station adds the cell corresponding to the cell identity carried in the A4 measurement report as a slave station, the master station receiving an adding completion message from the slave station, the master station sending a first path switching request message to a Mobility Management Entity, MME, and receiving a first path switching acknowledgement message from the MME, wherein the first path switching request message comprises a first virtual cell identity, a master station identity of the master station in the first virtual cell and slave station identities of slave stations in the first virtual cell.

4. The method according to claim 1, wherein the method further comprises:

the target master station receiving the switching request message from the master station, the target master station generating a third virtual cell key according to the switching request message from the master station, and sending a deletion request message to a slave station of the target master station;

the target master station receiving a deletion acknowledgement message from the slave station and sending a third adding request message to the slave station; and the target master station receiving a third adding command message from the slave station and sending a switching command message to the master station which sends the switching request message, wherein the target master station and slave stations of the master station which sends the switching request message form a third virtual cell; and the third adding request message comprises the second encryption algorithm and the third virtual cell key.

5. A non-transitory computer storage medium, storing computer-executable instructions used for executing the method according to claim 1.

6. A method for dynamically constructing a virtual cell, applied to an ultra-dense network, comprising:
   User Equipment, UE, selecting a serving cell, using the selected serving cell as a master station and establishing a service on the master station;
   the UE receiving an event A4 from the master station and performing measurement on neighboring cells of the master station;
   when it is judged that there is a cell which satisfies the event A4 in the neighboring cells of the master station, the UE sending an A4 measurement report to the master station; and
   the UE receiving a first Radio Resource Control, RRC, connection reconfiguration message from the master station, generating a first encryption key according to the first RRC connection reconfiguration message, performing reestablishment by using the generated first encryption key, sending a first RRC connection reconfiguration completion message to the master station and initiating a random access process to a slave station, wherein the method further comprises:
   the UE receiving an event A2 from the master station;
   the UE performing measurement on slave stations in a first virtual cell; when it is judged that there is a cell which satisfies the event A2 in the slave stations of the first virtual cell, the UE sending an A2 measurement report to the master station; and
   the UE receiving a second RRC connection reconfiguration message from the master station, generating a second encryption key according to the second RRC connection reconfiguration message and performing reestablishment by using the generated second encryption key; and the UE sending a second RRC connection reconfiguration completion message to the master station,
   and the UE generating a second encryption key according to the second RRC connection reconfiguration message comprises:
   the UE generating a second virtual cell key according to a second current value of a first S counter in the second RRC connection reconfiguration message and a key from a core network, and generating the second encryption key according to the generated second virtual cell key and a physical address of the UE by using the first encryption algorithm,
   or,
   the method further comprises:
   the UE receiving an event A5 from the master station and the UE performing measurement on neighboring cells of the master station;
   when it is judged that there is a cell which satisfies the event A5 in the neighboring cells of the master station, the UE sending an A5 measurement report to the master station; and
   the UE receiving a third RRC connection reconfiguration message from the master station, generating a third encryption key according to the third RRC connection reconfiguration message, performing reestablishment by using the generated third encryption key, sending a third RRC connection reconfiguration completion message to the target master station and initiating a random access process to a slave station,
   and the UE generating a third encryption key according to the third RRC connection reconfiguration message comprises:
   the UE generating a third virtual cell key according to a current value of a second S counter in the third RRC connection reconfiguration message, a key from a core network, and a current value of a Next Chaining Counter, NCC, and generating the third encryption key according to the generated third virtual cell key and a physical address of the UE by using the second encryption algorithm.

7. The method according to claim 6, wherein the A4 measurement report comprises one or more cell identities of a cell/cells which satisfies/satisfy the event A4.

8. The method according to claim 6, wherein the UE generating a first encryption key according to the first RRC connection reconfiguration message comprises:
   the UE generating a first virtual cell key according to a first current value of a first S counter in the first RRC connection reconfiguration message and a key from a core network, and generating the first encryption key according to the generated first virtual cell key and a physical address of the UE by using a first encryption algorithm in the first RRC connection reconfiguration message.

9. A non-transitory computer storage medium, storing computer-executable instructions used for executing the method according to claim 6.

10. A method for dynamically constructing a virtual cell, applied to an ultra-dense network, comprising:
    a master station sending an event A4 to User Equipment, UE, and receiving an A4 measurement report from the UE;
    the master station adding a cell corresponding to a cell identity carried in the A4 measurement report as a slave station,
    wherein the master station and slave stations form a first virtual cell,
    the master station generating a first virtual cell key according to a first current value of a first S counter and a key from a core network;
    a slave station receiving a first adding request message or a second adding request message from a master station, generating a first encryption key according to the first adding request message or the second adding request message, and performing configuration by using the generated first encryption key; and
    the slave station sending a first adding command message or a second adding command message to the master station,
    wherein the first adding request message comprises the first virtual cell key and an encryption algorithm list; the first adding command message comprises a first encryption algorithm; the second adding request message comprises the first virtual cell key and the first encryption algorithm.

11. The method according to claim 10, wherein generating a first encryption key according to the first adding request message comprises:
    selecting the first encryption algorithm for the UE from an encryption algorithm list in the first adding request message, and generating the first encryption key according to a first virtual cell key in the first adding request message and a physical address of the UE by using the first encryption algorithm; and
generating a first encryption key according to the second adding request message comprises:
generating the first encryption key according to a first virtual cell key in the second adding request message and the physical address of the UE by using the first encryption algorithm,
and,
the first adding command message or the second adding command message further comprises a first current value of a first S counter in the first adding request message or the second adding request message.

12. The method according to claim 10, wherein the method further comprises:
after a random access process initiated by the UE is completed, the slave station sending an adding completion message to the master station.

13. The method according to claim 10, wherein the method further comprises:
the slave station receiving a deletion request message from the master station, the slave station releasing corresponding resources and sending a deletion acknowledgement message to the master station,
or,
the slave station receiving a third adding request message from a target master station, the slave station generating a third encryption key according to the third adding request message, performing configuration by using the generated third encryption key and sending a third adding command message to the target master station,
and wherein generating a third encryption key according to the third adding request message comprises:
generating the third encryption key according to a third virtual cell key in the third adding request message and a physical address of UE by using a second encryption algorithm in the third adding request message.

14. A non-transitory computer storage medium, storing computer-executable instructions used for executing the method according to claim 10.

15. A device for dynamically constructing a virtual cell, comprising an integrated circuit and a storage device, wherein the storage device stores circuit-executable programs, and the programs when executed perform operations comprising:
sending an event A4 to User Equipment, UE;
receiving an A4 measurement report from the UE; and
adding a cell corresponding to a cell identity carried in the A4 measurement report as a slave station,
wherein a master station and slave stations form a first virtual cell,
the programs when executed perform operations further comprising:
sending an event A2 to the UE;
receiving an A2 measurement report from the UE; and
deleting a slave station corresponding to a slave station identity carried in the A2 measurement report; and performing key updating on the UE and slave stations of a second virtual cell,
wherein the master station and other slave stations except the deleted slave station in the first virtual cell forming the second virtual cell,
wherein deleting a slave station corresponding to a slave station identity carried in the A2 measurement report comprises:
sending a deletion request message to the slave station corresponding to the slave station identity carried in the A2 measurement report; and receiving a deletion acknowledgement message from the slave station,
and performing key updating on the UE and slave stations of a second virtual cell comprises:
changing the first current value of the first S counter to obtain a second current value of the first S counter and generating a second virtual cell key according to the second current value of the first S counter; and
sending a key updating request message to the slave stations of the second virtual cell and sending a second RRC connection reconfiguration message to the UE,
wherein the key updating request message comprises the second virtual cell key and the second RRC connection reconfiguration message comprises the second current value of the first S counter,
wherein changing the first current value of the first S counter to obtain a second current value of the first S counter comprises: adding 1 to the first current value of the first S counter to obtain a second current value of the first S counter,
or,
the programs when executed perform operations further comprising:
sending an event A5 to the UE; sending a switching request message to a target master station corresponding to a cell identity carried in the A5 measurement report; and sending a third RRC connection reconfiguration message to the UE; and
receiving an A5 measurement report from the UE; and receiving a switching command message from the target master station,
wherein the switching request message comprises a key from a core network, a current value of a Next Chaining Counter, NCC, and an encryption algorithm list, and the third RRC connection reconfiguration message comprises a second encryption algorithm, a current value of a second S counter and the current value of the NCC.

16. A device for dynamically constructing a virtual cell, comprising an integrated circuit and a storage device, wherein the storage device stores circuit-executable programs, and the programs when executed perform operations comprising:
selecting a serving cell, use the selected serving cell as a master station and establishing a service on the master station;
receiving an event A4 from the master station and performing measurement on neighboring cells of the master station; and receiving a first Radio Resource Control, RRC, connection reconfiguration message from the master station, generating a first encryption key according to the first RRC connection reconfiguration message and performing reestablishment by using the generated first encryption key; and
when it is judged that there is a cell which satisfies the event A4 in the neighboring cells of the master station, sending an A4 measurement report to the master station; and sending a first RRC connection reconfiguration completion message to the master station and initiating a random access process to a slave station,
the programs when executed perform operations further comprising:
receiving an event A2 from the master station; performing measurement on slave stations in a first virtual cell; and receiving a second RRC connection reconfiguration message from the master station, generating a second encryption key according to the second RRC connection reconfiguration message and performing reestablishment by using the generated second encryption key; and when it is judged that there is a cell which satisfies the event A2 in the slave stations of the first virtual cell, sending an A2 measurement report to the master station; and sending a second RRC connection reconfiguration completion message to the master station, wherein generating a second encryption key according to the second RRC connection reconfiguration message comprises:

generating a second virtual cell key according to a second current value of a first S counter in the second RRC connection reconfiguration message and a key from a core network, and generating the second encryption key according to the generated second virtual cell key and a physical address of User Equipment, UE, by using the first encryption algorithm, or, the programs when executed perform operations further comprising:

receiving an event A5 from the master station and performing measurement on neighboring cells of the master station; and receiving a third RRC connection reconfiguration message from the master station, generating a third encryption key according to the third RRC connection reconfiguration message and performing reestablishment by using the generated third encryption key; and when it is judged that there is a cell which satisfies the event A5 in the neighboring cells of the master station, sending an A5 measurement report to the master station; and sending a third RRC connection reconfiguration completion message to the target master station and initiating a random access process to a slave station, wherein generating a third encryption key according to the third RRC connection reconfiguration message comprises:

generating a third virtual cell key according to a current value of a second S counter in the third RRC connection reconfiguration message, a key from a core network, and a current value of a Next Chaining Counter, NCC, and generating the third encryption key according to the generated third virtual cell key and a physical address of the UE by using the second encryption algorithm.

17. A device for dynamically constructing a virtual cell, comprising an integrated circuit and a storage device, wherein the storage device stores circuit-executable programs, and the programs when executed perform operations comprising:

a master station sending an event A4 to User Equipment, UE, and receiving an A4 measurement report from the UE;

the master station adding a cell corresponding to a cell identity carried in the A4 measurement report as a slave station, wherein the master station and slave stations form a first virtual cell, the master station generating a first virtual cell key according to a first current value of a first S counter and a key from a core network;

the programs when executed perform operations further comprising:

receiving a first adding request message or a second adding request message from a master station, generating a first encryption key according to the first adding request message or the second adding request message and performing configuration by using the generated first encryption key; and sending a first adding command message or a second adding command message to the master station, wherein the first adding request message comprises the first virtual cell key and an encryption algorithm list the first adding command message comprises a first encryption algorithm; the second adding request message comprises the first virtual cell key and the first encryption algorithm.

18. The device according to claim 17, the programs when executed perform operations further comprising:

after a random access process initiated by the UE is completed, sending an adding completion message to the master station.

19. The device according to claim 17, the programs when executed perform operations comp comprising:

receiving a deletion request message from the master station; and releasing corresponding resources and sending a deletion acknowledgement message to the master station, or, receiving a third adding request message from a target master station; and generating a third encryption key according to the third adding request message and performing configuration by using the generated third encryption key; and sending a third adding command message to the target master station.

* * * * *